US011936531B2

(12) United States Patent
Obara et al.

(10) Patent No.: US 11,936,531 B2
(45) Date of Patent: Mar. 19, 2024

(54) TRANSFORMING CONTENT IN A DOCUMENT USING CHAINED APPLICATIONS IN A CLIENT-SERVER ARCHITECTURE

(71) Applicants: Atlassian Pty Ltd., Sydney (AU); Atlassian Inc., San Francisco, CA (US)

(72) Inventors: Piotrek Obara, San Francisco, CA (US); Engin Tekin, San Francisco, CA (US); Guo Tao Deng, Mountain View, CA (US); Ruslan Arkhipau, San Jose, CA (US); Oleksandr Beztsinnyi, San Jose, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/565,871

(22) Filed: Dec. 30, 2021

(65) Prior Publication Data
US 2023/0216748 A1 Jul. 6, 2023

(51) Int. Cl.
*G06F 7/02* (2006.01)
*G06F 16/00* (2019.01)
*G06F 16/93* (2019.01)
*H04L 41/22* (2022.01)

(52) U.S. Cl.
CPC .............. *H04L 41/22* (2013.01); *G06F 16/93* (2019.01)

(58) Field of Classification Search
CPC ................................. H04L 41/22; G06F 16/93
See application file for complete search history.

(56) References Cited

U.S. PATENT DOCUMENTS

| 9,525,600 | B1* | 12/2016 | Shen | H04L 41/0233 |
| 11,726,635 | B2* | 8/2023 | Boucher | G06F 40/197 |
| | | | | 715/227 |
| 2014/0331124 | A1* | 11/2014 | Downs | G06F 40/106 |
| | | | | 715/243 |
| 2020/0334879 | A1* | 10/2020 | Suezawa | G06F 40/166 |

OTHER PUBLICATIONS

Martin, Daniel, "Techniques of embedding external elements into web pages," Akveo blog Feb. 12, 21, from https://www.akveo.com/blog/techniques-of-embedding-external-elements-into-web-pages, accessed Nov. 3, 23. (Year: 2021).*

* cited by examiner

*Primary Examiner* — Bruce M Moser
(74) *Attorney, Agent, or Firm* — Brownstein Hyatt Farber Schreck, LLP

(57) ABSTRACT

A method for displaying content in a graphical user interface (GUI) of an instance of a frontend application providing frontend functionality associated with a cloud platform. The method includes initiating a first request to execute a set of operations against a foreign dataset to generate a GUI element. The method includes requesting a data provider to transmit a copy of the foreign dataset, and receiving, from the data provider, the foreign dataset. The method includes submitting, to a first endpoint, a second request providing the foreign dataset as input to the first endpoint, and submitting, to a second endpoint, a third request providing first modified data, received from the first endpoint, as input to the second endpoint. The method includes receiving, from the second endpoint, second modified data, and performing at least one operation to generate the GUI element based on the second modified data.

23 Claims, 7 Drawing Sheets

TRANSFORMING CONTENT IN A DOCUMENT USING CHAINED APPLICATIONS IN A CLIENT-SERVER ARCHITECTURE

TECHNICAL FIELD

Embodiments described herein relate to a document presentation in a document management system and, in particular to systems and methods for dynamically transforming content stored in one format to another format for presentation in a graphical user interface on a client device.

BACKGROUND

In a collaborative work environment, an organization (e.g., a corporation, a government institute) may have its employees working in different teams, for example, a finance team, a marketing team, a product development team, and so on. Each team may be working on different projects. Each team may have their own rules for preparing a document. In other words, each team may have their own stylesheet for each document. However, it may also be required that each document also need to conform with a particular stylesheet (e.g., look and feel) as recommended by the organization. In many cases, it may be difficult for a team member to prepare or transform a document that matches the stylesheet recommended by the team and the organization.

In some cases, a team member may be required to access data for preparing a document. For example, a product development team member may not have access to underlying data related to finance or marketing. The data related to finance or marketing may be available on a database or a system, which may not be accessible to the product development team member. Therefore, when the product development team member needs data related to finance or marketing, he may be required to go through a process of approval to get access to the data. In addition, the data stored in different forms may be required to be presented according to the stylesheet. However, manually transforming data or writing code to transform data according to a stylesheet recommended by the team and/or the organization may be time consuming.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
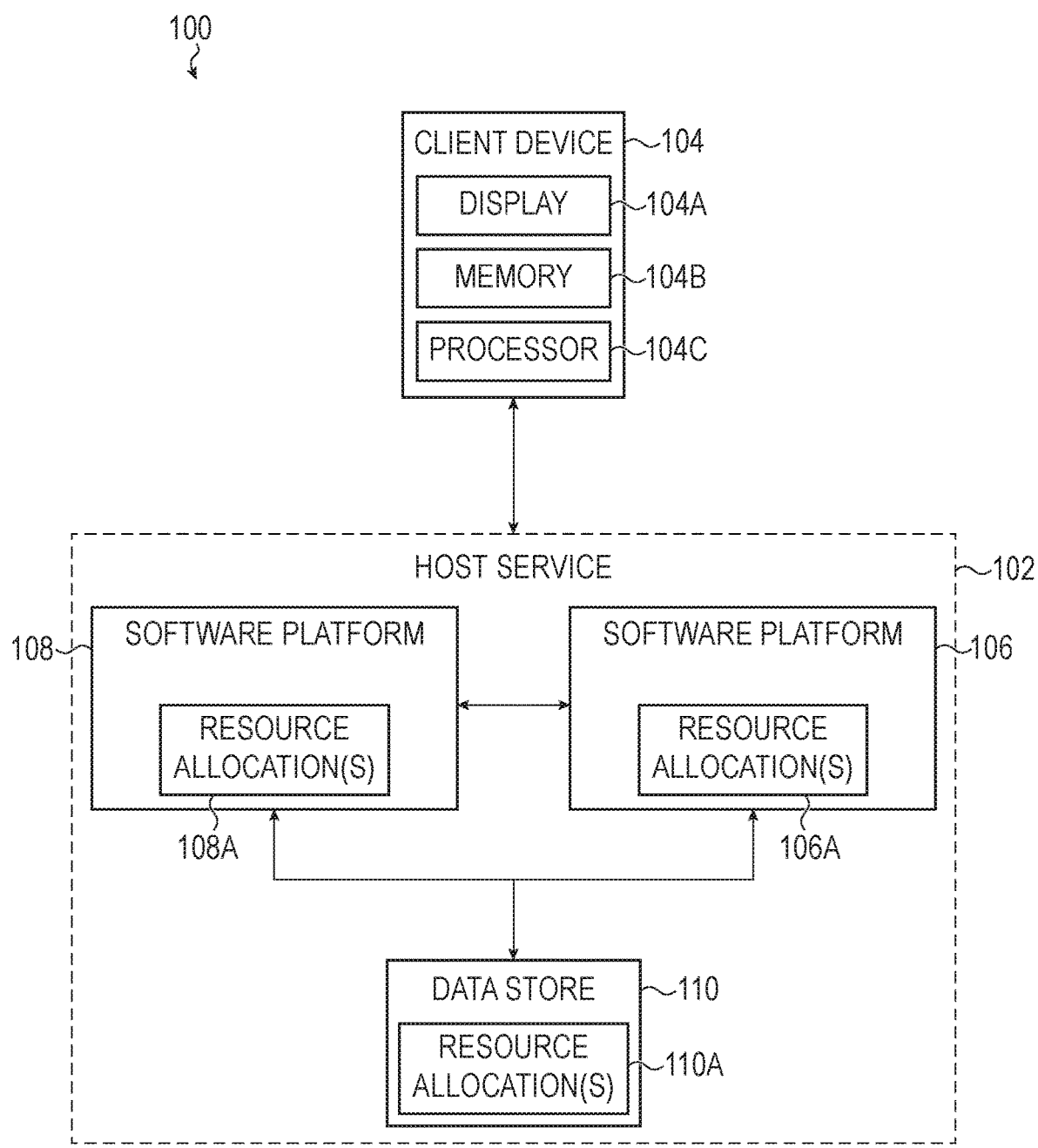
FIG. 1 depicts a simplified system diagram of a collaborative work environment, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for dynamically transforming content stored in one data or presentation format to another data or presentation format. The dynamically transformed content may be presented in a graphical user interface (GUI) on a client device.

As mentioned above, in a collaborative work environment, an organization (e.g., a corporation, a government institute) may have its employees working in different teams, for example, a finance team, a marketing team, a product development team, and so on. Each team may be working on different projects. A team member of a product development team (a user) may have been asked to prepare a document. The user may use an instance of a frontend application on a client device to prepare the document.

The frontend application may be an application running on a client device, such as a desktop, a laptop, a tablet, a mobile device, a phone, a smartwatch, and so on. The frontend application may be a mobile application or a native application running on the client device. By way of a non-limiting example, the frontend application may be a word processing application, a spreadsheet application, a web browser application, and/or a custom application providing coupling to a backend application running on a backend system described below in detail. More generally and broadly, in many embodiments, a user may create and/or update a document by leveraging a system following a client-server architecture.

A user may create and/or update the document using a GUI provided by the frontend application. As mentioned above, each team may have their own rules for preparing a document. In other words, each team may have their own stylesheet (e.g., look and feel) for each document. In addition, each document may also need to conform with a particular stylesheet as recommended by the organization. The user may also need to get data for preparing the document. The data required by the user may have been stored in a datastore. The user may or may not have access to the datastore where the data required by the user to create and/or update a document.

In some cases, the datastore may be included in the backend system. By way of a non-limiting example, a backend application may be executing on the backend system. The backend application may be communicatively coupled with the frontend application executing on the client device. Accordingly, an environment in which the user is creating and/or updating the document may be referred as a client-server architecture.

In some cases, the backend system may be an application server, which may be implemented as hardware or a virtual machine executing on a cloud platform. In some cases, the client device may also be implemented as hardware or a virtual machine executing on a cloud platform.

In some cases, the backend application may be a serverless function. A serverless function may be an application, a function, a module, and/or a microservice installed in a cloud network, and executing on a physical and/or a virtual machine. A developer of a serverless function is required to only focus on developing a code to perform functions for which the serverless function is developed, but has not to worry about any aspects of deployment and/or installation of to provide a service. The serverless function may therefore be considered as a hosted application executing in a cloud network, such as a data warehouse or a cloud computing network, which may be managed by a third-party for all of its resource related aspects. In some cases, the serverless function may be a microservice. The serverless function may also be known as Function-as-a-Service (FaaS).

In some cases, a microservice executing on a backend system be may receive an input request including an input reference document for transformation at an endpoint of the microservice.

As stated above, a product development team member (a user) may have been asked to prepare a document, for example, a feasibility report concerning a new product. For preparing the feasibility report, the user may need to access data (e.g., some financial data) stored in a datastore. The datastore including the financial data may only be accessible to members of a finance team. Accordingly, a product development team member may not have access to the datastore including the financial data. In other words, a userid and/or a password (authorization or authentication credentials) of a product development team member may not allow the product development team member to access the datastore and retrieve the needed financial data.

In some cases, the data may therefore be made available using a function, an application, and/or a module, which may periodically and/or upon request from a user may retrieve data from the datastore. The function, the application, and/or the module to retrieve data from the datastore may be executing on the backend system and/or the client device described above. The function, the application, and/or the module retrieving data from the datastore may thus act as an interface. In some cases, the interface may return the data retrieved from the datastore without any further transformation and/or conversion. However, in some cases, the interface may transform the received data from the datastore in a different format before the retrieved data is transmitted to the user (or the frontend application) for creating and/or updating the document.

As described above, each team and/or organization may require each document to be created and/or updated according a stylesheet. For example, the stylesheet may require each date to be displayed in a YYYY-MM-DD format. However, the datastore may store data having a date field in a MM-DD-YYYY format. As a result, the user working on the document may be need to either manually or write a script to transform each date value in the data to the format recommended according to the stylesheet recommended by the team and the organization. As stated above, manually transforming the data or writing of a script to transform the data is time consuming.

Accordingly, the function, the application, and/or the module retrieving data from the datastore (the interface) may transform the received data from the datastore in a different format before the retrieved data is transmitted to the user (or the frontend application) for creating and/or updating the document. In some cases, the datastore may be part of the same backend system or a different backend system.

The retrieved data may then be made available to a user (a member of a team of an organization as described above) by identifying the retrieved data using a unique identifier (UUID). By way of a non-limiting example, a UUID may be local UUID or a global UUID. The local UUID and/or the global UUID may be published so that a user can access, import, and/or export the data using the UUID (local UUID and/or global UUID). In some cases, the data published using a local UUID and/or a global UUID may be available for search and use by a user based on various search criteria, including but not limited to, a data type, data description, a database name, and so on. In some cases, the data published using a local UUID and/or a global UUID may be available in the frontend application described above.

In some embodiments, in addition to data retrieved from the datastore need to be according to a stylesheet recommended by a team or an organization, as described above, other parts of the document may also need to meet other recommendations as specified in the stylesheet. For example, text may be required to be of a certain font style and/or a font size. In some cases, background of a document may be required to be of a certain color, and/or include a watermark.

As described above, transforming parts of the document to meet a number of requirements mentioned in a stylesheet may be difficult and time consuming for a user. Accordingly, a user may invoke or execute a function, an application, and/or a module from a GUI executing on a client device to transform one or more parts of a document to meet requirements, for example, formatting requirements, as specified in a stylesheet.

In some cases, a user may desire to represent a data of a document in a different way. For example, a document may include a table of data showing statistics. The user may desire to represent the data in the table pictorially for better representation. For example, the data in the table may be presented using a chart, a line graph, a bar graph, a pie chart, a scatter plot, and/or a histogram. A user may not be comfortable or may not have required skills to transform the data of the table (a part or section of a document) into another format (a pictorial representation). Accordingly, a user may invoke or execute a function, an application, and/or a module from a GUI executing on a client device to transform presentation of one or more parts of a document in one form to another form.

By way of a non-limiting example, a document may include a number of different sections, each section having a title, as shown below:
Title
Subtitle 1
Subtitle 2
Subtitle 3
Subtitle 4
Subtitle 5
Subtitle 6
Subtitle 7

A user may want to convert each section to have a numbered heading and a title, for example, as shown below:

⋂1 Title
1.1 Subtitle 1
1.2 Subtitle 2
1.2.1 Subtitle 3
1.2.2 Subtitle 4
1.3 Subtitle 5
⋂2 Subtitle 6
2.1 Subtitle 7

Transforming data and/or sections of a document as described above may be a time consuming process. However, a user may invoke or execute a function, an application, and/or a module from a GUI executing on a client device to transform data and/or sections of a document from titled sections to numbered headings and titles.

In some cases, a user may want to generate a document including a table (e.g., a database table) that may be generated by joining two or more SQL tables on a specific column of the two or more SQL tables. Each user may not have necessary skills to generate a table for a document based on two or more SQL tables as described herein. In some cases, a user may also want the table to be represented pictorially, for example, as a pie chart, and so on. A user may invoke or execute a function, an application, and/or a module from a GUI executing on a client device to transform data and/or sections of a document as described herein In the context of an application, a function, and/or a module, an input to the application, the function, and/or the module for transforming data and/or a part (or section) of a document from one format or form to another format or form may be referred as an input reference document. The input reference document may be a document, a data object or a data portion of a document, for example. The application, the function, and/or the module may transform data and/or a part of a document received as an input reference document into another format or form and may generate an output reference document.

In some embodiments, an output reference document from an application, a function, and/or a module may be provided as an input reference document to the same or another application, function, and/or module. In other words, an application, a function, and/or a module may be chained with the same or another application, function, and/or module.

Similar to data retrieved from a datastore that can be referenced using a local UUID and/or a global UUID, an input reference document and/or an output reference document may also be referenced using a local UUID and/or a global UUID. A local UUID may identify a reference within a scope of a document and/or an application. The global UUID may identify a reference in a global scope, and thus may be used by other documents and/or applications. In other words, a local UUID may be used to identify or refer a document in a specific application running on a frontend and/or a backend system, and a global UUID may be used to identify or refer a document across many applications running on a frontend and/or a backend system.

As described herein, one or more applications, functions, and/or modules may allow a user to create, edit, and/or update a document using a graphical user interface with a minimum effort and/or almost no coding or less coding for transforming data in one format or form (or one reference document) to another format or form (or another reference document).

A reference document may include content or data that may be either static and/or dynamic in nature. The static data may not change over a time period, whereas a dynamic data may change over a time period. Accordingly, processing of a reference document may include live processing and/or stable processing.

In live processing, data may be fetched again and/or transformed with each request to generate an output reference based on the received input reference. In stable processing, data may be fetched and/or transformed to generate an output reference when a request to generate an output reference from the input reference is received first time. Once an output reference is generated, the generated output reference may not be updated in the stable processing.

A reference document as described herein may be a data reference document and/or a configuration reference document. A data reference document may include data being transformed by an application, a function, and/or a module, as described herein, according to a configuration reference document. A configuration reference document may provide one or more rules for transforming data in a data reference document according to a stylesheet, as described above.

In the following, an example code of an application, a function, and/or a module, for providing an input reference document to an application, a function, and/or a module, and a generating an output reference for exporting or publishing as a local reference (using a local UUID) and/or as a global refence (using a global UUID) for incorporating in a document, and/or chaining with the same or another application, function, and/or module is shown.

Application "Customer Trouble Tickets with related Software Development PRs"
{
    define ref #CustomerIssueSearchConfig={project: "xyzzy"; sprint: 42}
    use processor #CustomerDataSource
    define ref #CustomerIssues=#CustomerDataSource←CustomerIssueSearchConfig
    use processor #ExtractColumn
    define ref #CustomerIssueKeys=#ExtractColumn←#CustomerIssues
    define ref #SoftwareDevelopmentPRSearchConfig=issueKeys: #CustomerIssueKeys}
    use processor #SoftwareDevelopmentDataSource
    define ref #SoftwareDevelopmentPRs=# SoftwareDevelopmentDataSource←SoftwareDevelopmentPRSearchConfig
    define ref #JoinSettings={column: #CustomerIssues.issueKeys, column: #SoftwareDevelopmentPRs.IssueKey}
    use processor #TableJoin
    define ref #CustomerIssuePRs=#TableJoin←#JoinSettings
    export #CustomerIssuePRs
}

The example code shown above describes a document or a section of a document being used as an input reference document to an application, a function, and/or a module, and providing a generated output reference document as an input reference document to another application, function, and/or module.

The above example code also describes chaining of an application, a function, and/or a module with the same or another application, function, and/or module, and exporting of a reference document (for example, an output reference document). By chaining an output reference document of an application, a function, and/or a module with the same or another application, function, and/or module, a user may not need to write a complex code and/or a lengthy code to transform data or a section of a data document from one format or form to another format or form.

In other words, by chaining an output reference document as an input reference document, a user can generate more than one different format or form of reference documents for use in his document and/or chaining with the same and/or another application, function, and/or module.

In some cases, chaining of an output reference document of an application, a function, and/or a module with the same or another application, function, and/or module may be performed by exchanging a reference document as a JavaScript Object Notation (JSON) object.

In some embodiments, a reference provided as an input to a processor may be an object of a page. The object may be represented as a JSON object. Accordingly, an output reference may also be presented as a JSON object.

An example JSON object for a reference document may be as shown below:
{
"Type": "extension",
"attrs": {
. . .
"extensionType": "com.organization.application.macros.core",
"dataSource": "http://vendor.hostdataSource",
"dataSchema": "TableDataSchema",
. . .
}
"localId": "123abc"
}

As shown above, a reference may be identified by a localId field of the JSON object, which represents a local UUID value. The JSON object shown above is an example only, and may include other attributes not shown here.

The reference document may also be communicated to a frontend application executing on a client device as a JSON object. As a result, the reference document may be displayed as specified by the JSON object.

A document displayed on a graphical user interface of a frontend application may also be referenced as a page in the present disclosure. However, referencing a document displayed on a graphical user interface of a frontend application as a page does not limit the frontend application to a hypertext markup language (HTML) based web browser application and/or a backend system to an HTML host.

These foregoing and other embodiments are discussed below with reference to FIGS. 1, 2A, 2B, and 3-6. However, those skilled in the art will readily appreciate that the detailed description given herein with respect to these figures is for explanation only and should not be construed as limiting.

FIG. 1 depicts a simplified system diagram of a collaborative work environment, such as described herein.

A collaborative work environment may be a multiplatform computing environment 100 for transforming data stored in one format into another format. The data transformation may be performed using one or more applications, functions, and/or modules. In some cases, the one or more applications, functions, and/or module may also be implemented as a microservice and/or a serverless function. The transformed data may be incorporated into a document (or a page) for presentation in a graphical user interface of a frontend application executing on a client device. The data may be transformed by one or more applications, functions, modules, and/or microservice, and so on executing on one or more example software platforms shown in FIG. 1.

Example software platforms may include services, for example, for a document presentation in a document management system, including but not limited to, documentation services, document management systems, knowledge sharing systems, project management services, enterprise resource planning services, supply chain management services, and so on. Any content added to any of these services, including input(s) provided to customize a particular instance (or tenant experience) of a particular software platform, including multimedia data such as images, audio files, or videos, can be considered organization-owned content, as described herein.

In the illustrated example, the multiplatform computing environment 100, which is merely one example of an architecture such as described herein, may be implemented as a first party or third party cloud service, over virtual or physical hardware. In some cases, the multiplatform computing environment 100 may be implemented within a private network, such as an intranet defined for use by a single organization.

As may be appreciated by a person of skill in the art, a cloud service or network-accessible service can be physically architected in number of suitable ways. In one implementation, a request-response over TCP may be used. In another example, a WebSocket or other full-duplex client-server architecture may be used. In many cases, multiple physical resources may be leveraged to define one or more allocations of virtual resources, such as processor allocations or memory allocations.

It may be appreciated by a person of skill in the art that a processor allocation associated with a multiplatform computing environment, such as the multiplatform computing environment 100, may operate over one or more physical cores of one or more physical processors in one or more locations; regardless of configuration, however, a processor allocation as described herein can be configured to perform any suitable processing task associated with instantiation of, and/or operation of, one or more platforms or services of the multiplatform computing environment 100. Similarly, a memory allocation and/or a networking allocation may be associated with a multiplatform computing environment, such as the multiplatform computing environment 100, as described herein.

For simplicity of description and illustration, the multiplatform computing environment 100 is described herein as implemented/instantiated over a host service 102. The host service 102 communicably couples via one or more networking or wired or wireless communication protocols to a client device 104.

It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner. The client device 104 can be any suitable personal or commercial electronic device and may include, without limitation or express requirement, a display 104a, volatile or non-volatile memory (identified, collectively, as the memory 104b), and a processor 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104c of the client device 104 can be configured to execute one or more instances of a frontend application ("client application") or one or more frontend applications stored, at least in part, in the memory 104*b*. The frontend application may be a computer application, a mobile application or a native application running on the client device. By way of a non-limiting example, the frontend application may be a word application, a spreadsheet application, a web browser application, and/or a custom application having a graphical user interface to interact with a user (e.g., create, edit, update, and/or display a document).

Each respective client application and/or an instance of a client application can be instantiated by the processor 104*c*. In particular, the processor 104*c* may access a persistent memory (e.g., of the memory 104*b* or of a separate memory structure) to retrieve one or more executable binary files and/or other computer-executable instructions (collectively, "assets" or "executable assets").

The processor 104*c* thereafter can load at least a portion of the retrieved assets into a working memory (e.g., of the memory 104*b*), thereby at least partially instantiating a respective one instance of a respective one client application. For simplicity of description an implementation in which the client device 104 is configured to execute/instantiate a single client application is described below.

As noted above, in embodiments, the host service 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host service 102 may be a cluster of different computing resources, which may be geographically separated from one another. In this manner, generally and broadly, both the host service 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host service 102 and the client application supported/executed by the client device 104 are communicably coupled via a suitable network connection which may be wired, wireless, or a combination thereof. In some examples, the network connection may include the open Internet.

In other cases, the network connection coupling the host service 102 and the client application may include only a private intranet managed by, or otherwise utilized by, an organization such as referenced above. The host service 102 and the client application can communicate according to any suitable protocol, form, or format. In many examples, the host service 102 at least partially exposes an API that can be accessed by the client application to perform one or more functions. For example, the client application may leverage the API to request organization-owned data (such as described herein) from the host service 102.

For simplicity of description, the embodiments that follow reference a configuration in which the host service 102 and the client application are configured to communicate and transact information according to one or more communication protocols for a client-server architecture, including but not limited to, a RESTful API. Accordingly, it may be appreciated that this is merely one example and in other embodiments other signaling, communication, or data transaction methodologies may be used.

The host service 102 of the multiplatform computing environment 100 can be configured and/or implemented in a number of suitable ways. For example, as noted above, in many embodiments the host service 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the multiplatform computing environment 100.

For example, the host service 102 of the multiplatform computing environment 100 can serve as infrastructure to instantiate a first software platform 106 and a second software platform 108, each associated with a respective resource allocation of virtual and/or physical processors, memory, networking, and so on. These resource allocations are identified in the figure as the resource allocations 106*a*, 108*a* respectively.

The host service 102 may include a data store 110, which may also be associated with a respective resource allocation of virtual and/or physical processors, memory, networking, and so on (e.g., the resource allocation 110*a*). In some cases, the data store 110 may be part of another host service.

As with many embodiments described herein, any data stored by the data store 110 can be accessed by each of the first software platform 106 and the second software platform 108. In some cases, a particular data can be accessed by the first software platform 106 and presented in a first format and simultaneously or at a different time accessed by the second software platform 108 and presented in a second format.

As a result of this architecture, the data store 110 serves as single source of truth for substantially all data owned by an organization. In this manner, when data is changed or updated in a particular software platform, any data associated with that update can be added to or modified in the data store 110 such that future requests for that data will reflect the freshest data, regardless of which platform initiates the data update and regardless of which platform requests the data.

As noted above, an example data may store tabular data in any form or format. When accessed by the first software platform 106, the tabular data may be presented in a graphical user interface of a frontend application executing on the client device 104. In some cases, the tabular data may be filtered according to some parameter, an average of a particular value may be taken, and the average may be presented in a graphical user interface of a frontend application executing on the client device 104 as a numerical value, rounded to a predetermined precision. In some cases, the tabular data may be transformed by the host service 102 for presenting in a graphical user interface of a frontend application executing on the client device 104.

The first and second software platforms can be configured in a number of ways and/or may serve different purposes. An example software platform may be related to, including but not limited to, documentation services, document management systems, knowledge sharing systems, project management services, enterprise resource planning services, supply chain management services, and so on.

In this example, organization-owned data may be documents, for example, for project management, software development, and so on. At some instant, the user may operate the client device 104 to initiate a request intended to be received by the document management system to retrieve data and/or documents. The data and/or documents may be returned in its original format or form, and may be transformed into another format or form to a frontend application executing on a client device for displaying in a graphical user interface.

In another example, a software platform may be a project management service. In this example, organization-owned data may be a set of documentation detailing one or more projects attributed to or otherwise associated with a particular user of the project management service. At some instant, the user may operate a graphical user interface rendered on the display 104a by the client application to initiate a request intended to be received by the project management service to retrieve the set of documentation detailing a selected project. In this example, the set of documentation can reference data stored by the data store 110.

These foregoing embodiments depicted in FIG. 1 and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
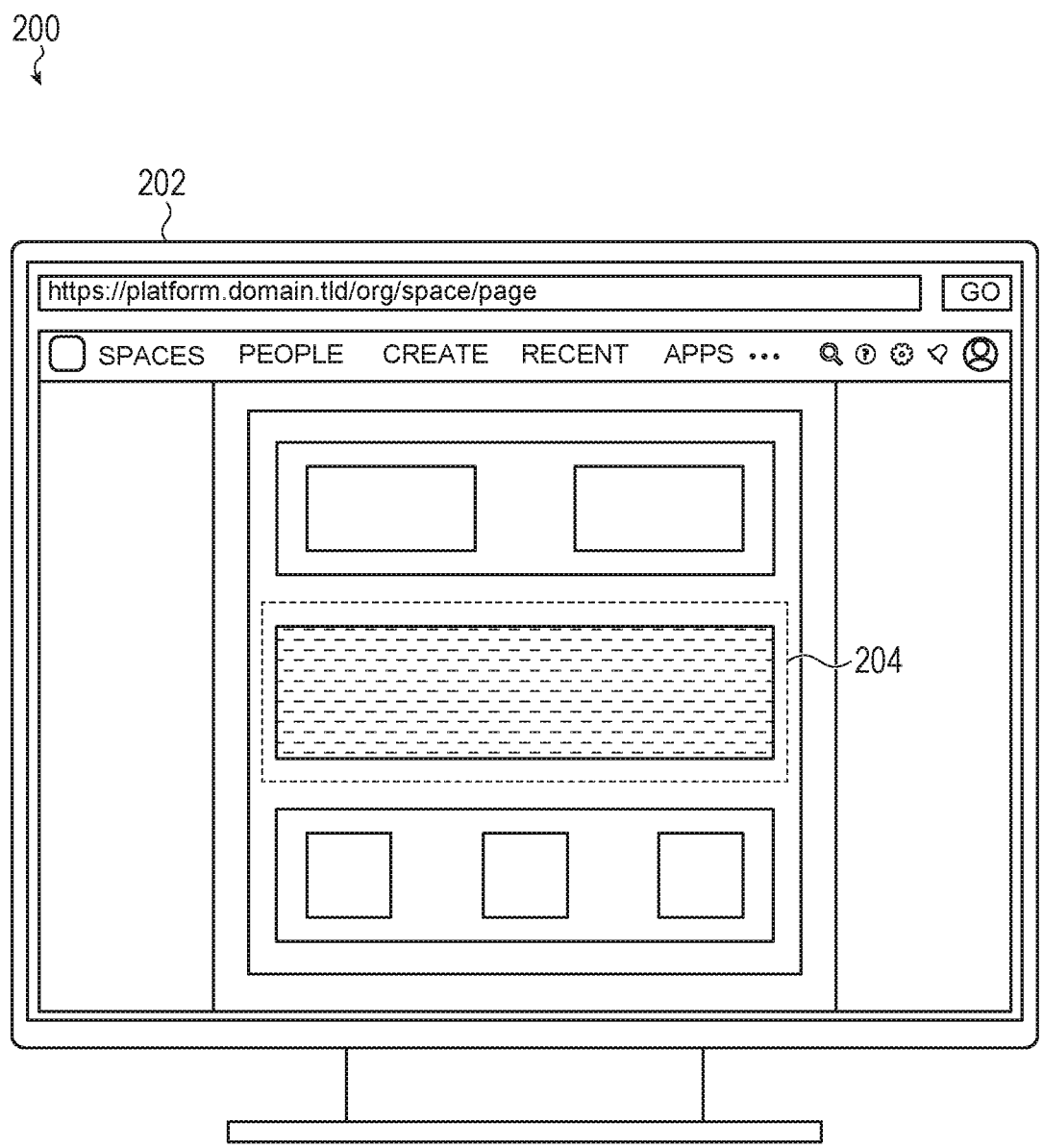
FIG. 2A depicts an example graphical user interface of a frontend application executing in a collaborative work environment, such as described herein.

FIG. 2A depicts an example graphical user interface of a frontend application executing in a collaborative work environment shown in FIG. 1, such as described herein. A GUI view 200 may be a GUI view of a frontend application executing on a client device 202. The client device 202 may be similar to the client device 104 discussed above. The GUI view 200 may display a document (or a page) 204 including a section 204A of the document 204, which may be, for example, data represented in a table format.

As described above, the section 204A of the page 204 in the table format may be a reference document described herein, which may be required to be transformed from one format or form to another format of form.

For example, the section 204A of the page 204 may be text, which may be required to be transformed according to a stylesheet of a team and/or an organization, as described herein.

In some cases, the section 204A of the page 204 may include a number of different sections, each section having a title, as shown below:
   #Title
   ##Subtitle 1
   ##Subtitle 2
   ###Subtitle 3
   ###Subtitle 4
   ##Subtitle 5
   #Subtitle 6
   ##Subtitle 7

A user may want to convert each section to have a numbered heading and a title, for example, as shown below:
   ∩1 Title
   ##1.1 Subtitle 1
   ##1.2 Subtitle 2
   ###1.2.1 Subtitle 3
   ###1.2.2 Subtitle 4
   ##1.3 Subtitle 5
   ∩2 Subtitle 6
   ##2.1 Subtitle 7

In some cases, a section 204A of the page 204 may be data represented as a table, and a user may like to represent the data in the table, for example, graphically (e.g., using a chart, a line graph, a bar graph, a pie chart, a scatter plot, and/or a histogram).

As described above, the page 204 and/or the section 204A of the page may be provided as an input reference document to an application, a module, a function, a microservice, and/or a microservice executing on a software platform 106 and/or 108. A described herein, a reference document may identified using a unique identifier (UUID). By way of a non-limiting example, a UUID may be local UUID or a global UUID, as described herein.

In some embodiments, a reference document may be communicated or exchange from the frontend application to an application, a module, a function, a microservice, and/or a microservice executing on a software platform 106 and/or 108 as a JSON object.

An example JSON object for a reference document may be as shown below:
{
"Type": "extension",
"attrs": {

```
. . .
"extensionType":    "com.organization.application.mac-
ros.core",
"dataSource": "http://vendor.hostdataSource",
"dataSchema": "TableDataSchema",
. . .
}
"localId": "123abc"
}
```

As shown above, a reference document may be identified by a localId field of the JSON object, which represents a local UUID value. The JSON object shown above is an example only, and may include other attributes not shown here.

In some cases, a reference document may be communicated to an application, a module, a function, a microservice, and/or a microservice executing on a software platform 106 and/or 108 as a hypertext markup language (HTML) object, an extensible markup language (XML), and so on.

As described herein, the application, the function, the module, the microservices, and/or the serverless function executing on the backend system may transform the received input reference document and generate an output reference document, which may also be communicated with a frontend application, and/or the same or another application, function, module, microservice, and/or serverless function, as a JSON object, an HTML object, and/or an XML object, and so on.

The output reference document received by a frontend application may be displayed in a GUI of the frontend application by performing at least one operation of a set of operations to generate a GUI element. At least one operation performed on the received output reference document may be generating a pictorial representation. The pictorial representation may include at least one or more of: a chart, a line graph, a bar graph, a pie chart, a scatter plot, and/or a histogram.

The output reference document may thus contain modified or transformed data of data in an input reference document to the application, the function, the module, the microservices, and/or the serverless function executing on the backend system.

These foregoing embodiments depicted in FIG. 2A and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Figure 2B:
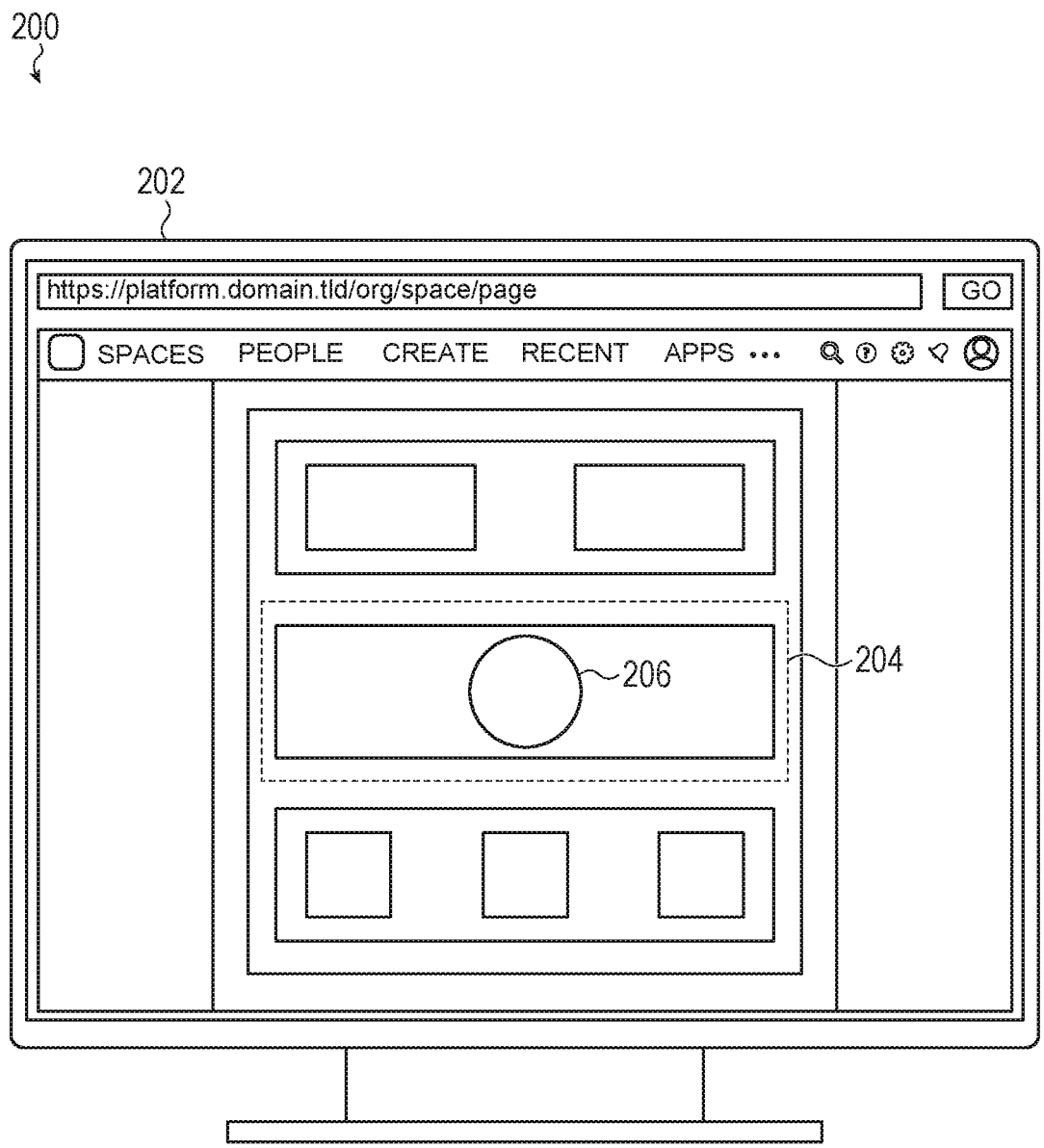
FIG. 2B depicts the graphical user interface of FIG. 2A showing an output reference transformed from an input reference, such as described herein.

FIG. 2B depicts the graphical user interface of FIG. 2A showing an output reference transformed from an input reference, such as described herein. A graphical user interview (GUI) view 200 is shown on a display of a client device 202. A graphical user interview (GUI) view 200 may be a GUI view of a frontend application executing on a client device 202. The client device 202 may be similar to the client device 104 discussed above. The GUI view 200 may display a document (or a page) 204 including a pictorial representation 206, for example, a pie chart corresponding to a section 204A of the document 204, which may be, for example, data represented in a table format, as described above.

In some embodiments, a frontend application executing on a client device 202 may generate the pictorial representation 206 based on an output reference document communicated to the frontend application from an application, a function, a module, a microservice, and/or a serverless function, and so on, executing on a backend system as a JSON object, an HTML object, and/or an XML object, and so on.

As described above, transformation or reformatting of data of an input reference document is not limited to examples described herein.

These foregoing embodiments depicted in FIG. 2B and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Figure 3:
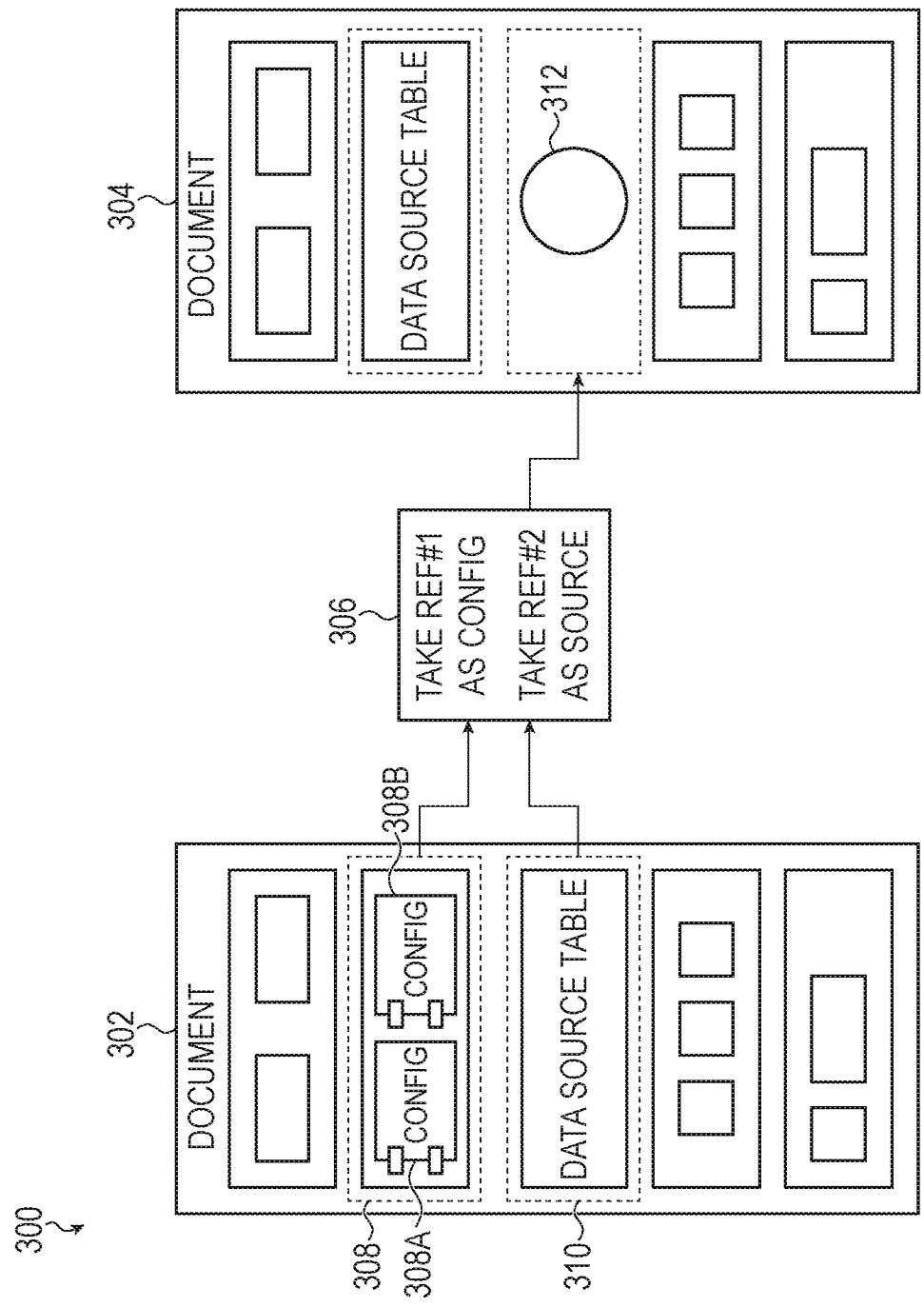
FIG. 3 depicts an example of an input reference and an output reference, such as described herein.

FIG. 3 depicts an example of an input reference and an output reference, such as described herein. As shown a view 300, a reference document 302 may be displayed in a GUI of an instance of a frontend application executing on a client device (e.g., 104, 202). The reference document 302 may include data section 310 and a configuration section 308. As described above, the data section 310 may act as a data reference input to an application, a module, a function, a microservice, and/or a serverless function 306 executing on a backend system, and the configuration section 308 may act as a configuration reference input 308 to 306.

By way of a non-limiting example, the configuration reference input may specify one or more configuration templates 308A, 308B, which may provide inputs to 306 to generate a reference document 304, e.g., an output reference document 304. The one or more configuration templates 308, 308B may be according to a stylesheet as specified by a team and/or an organization, and/or as specified by a user.

The application, module, function, microservice, and/or serverless function 306 may take the configuration reference input 308 to modify data in the data reference input 310 to generate the output reference document 304. The output reference document may include data from the data reference input 310 transformed, for example, as a pie chart 312. In some cases, the data reference input 310 may also be included in the output reference document 304.

A generated output reference document may be fed as an input reference to the same or another application, function, module, microservice, and/or serverless function, and so on, for further transformation.

An output reference document, as generated, may be sent to a frontend application as described above, as a JSON object, an HTML object, and/or an XML object. In some cases, the frontend application may process the received output reference document on a client device and/or may send it as an input reference document to a backend system for additional transformation and/or formatting of data in the input reference document.

These foregoing embodiments depicted in FIG. 3 and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Figure 4:
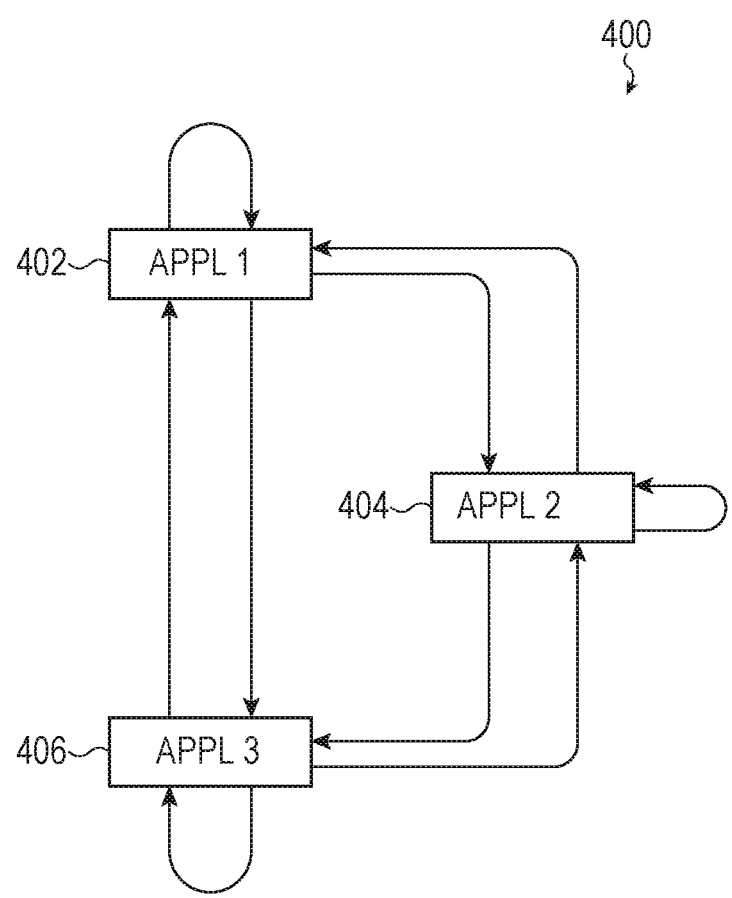
FIG. 4 depicts a framework of referentiality between various data processors for data transformation, as described herein.

FIG. 4 depicts a framework of referentiality between various applications, functions, modules, microservices, and/or serverless functions for data transformation, as described herein. A view 400 shown in FIG. 4 illustrates an output reference document generated by an application may act as an input reference document to the same or another application. In the view 400, three different applications, an application 1 402, an application 2 404, and an application 3 406 are shown. As shown in the view, an output of the application 1 402 may be provided as an input to the application 2 404, the application 3 406, and/or the application 1 402, for additional formatting and transformation of data in a reference document.

As described above, because an output reference document of the application 1 402 may be provided as an input reference document to the same or another application, a user may not be required to generate a complex code for transformation of data. Thus, complex transformation of data may be achieved by comparatively very little code written for an application.

In some cases, any of the application 1 402, the application 2 404, and/or the application 3 406 may be a third-party application, which may be developed and provided by a third party for transforming or reformatting of data in a reference document.

These foregoing embodiments depicted in FIG. 4 and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Figure 5:
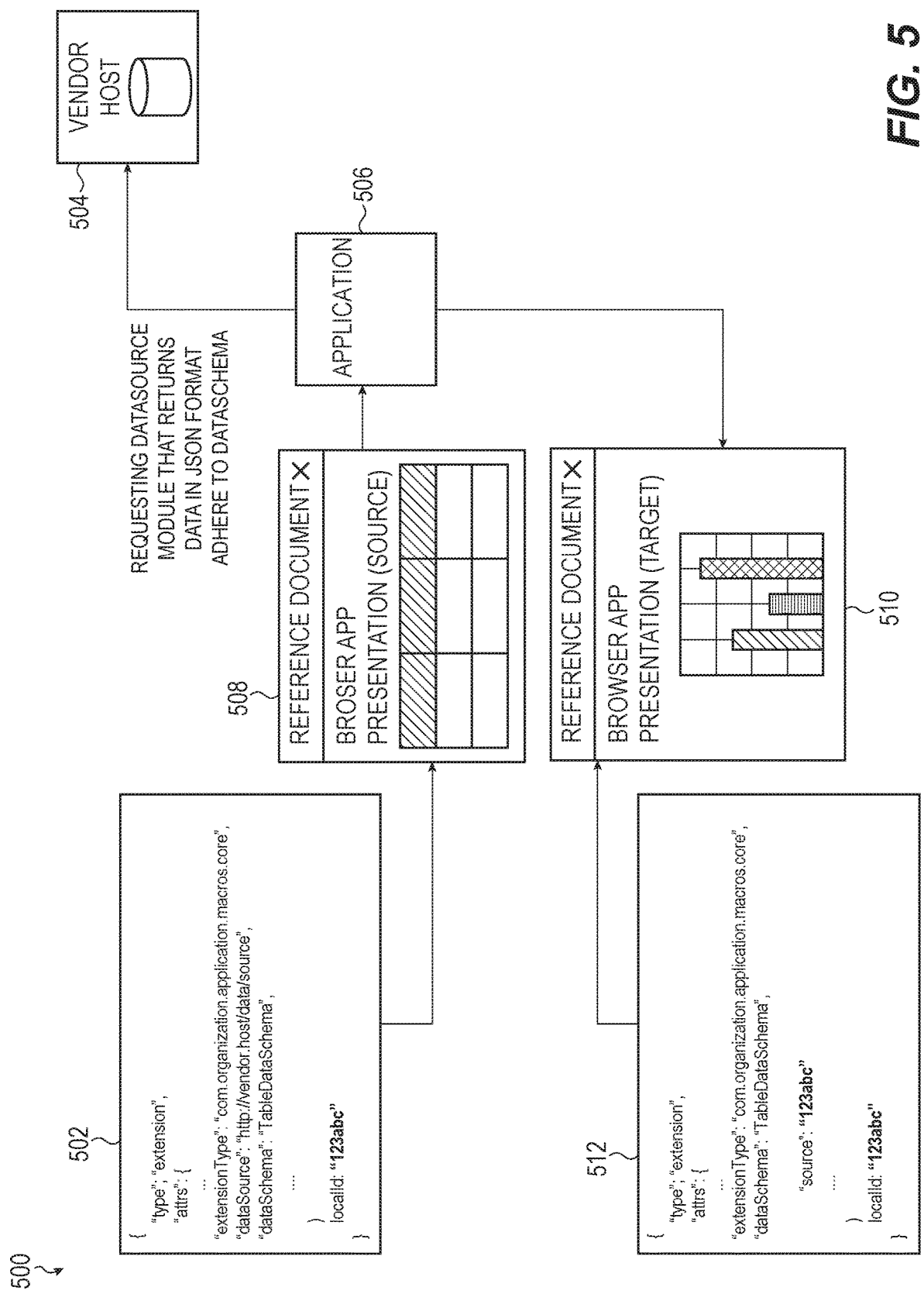
FIG. 5 depicts a dataflow from a data source to a graphical user interface of a frontend application, as described herein.

FIG. 5 depicts a dataflow from a data source to a graphical user interface of a frontend application, as described herein. As shown in a view 500, a user of a client device running an instance of a frontend application in a graphical user interface (GUI) may initiate a request to retrieve and perform or execute a set of operations on a dataset (or data) stored in a database at a datastore 504. The datastore 504 may be provided by a data provider. In some cases, the data provider may be a third party host of a datastore or the organization providing a collaborative work environment described in FIG. 1.

The user may request to receive data from the datastore 504 using the frontend application by sending a request to an application 506. The application 506 may retrieve the requested data from a data provider, and make it available to a user.

In some cases, the application 506 may periodically or upon request receive and/or update data from the datastore 504. The data received from the datastore 504 may be stored in a database and/or as a reference document. As described above, the reference document may be presented using any of the JSON object, an HTML object, and/or an XML object. In the view 500, the received data from the datastore 504 may be presented as a JSON object 502 in an output reference document transmitted to a frontend application. As shown the JSON object 502 may be an object of a reference document 508.

The user may, however, prefer to represent the received data pictorially, for example, as a graph. Accordingly, a reference document presented by the JSON object 502 may be provided as an input to another application or the same application (e.g., application 506) for further formatting or transforming of the data. Accordingly, another output reference document 510, as represented by a JSON object 512, may be generated. The output reference document 510 may represent data included in an input reference document 508 to a different format, for example, a bar graph.

These foregoing embodiments depicted in FIG. 5 and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Figure 6:
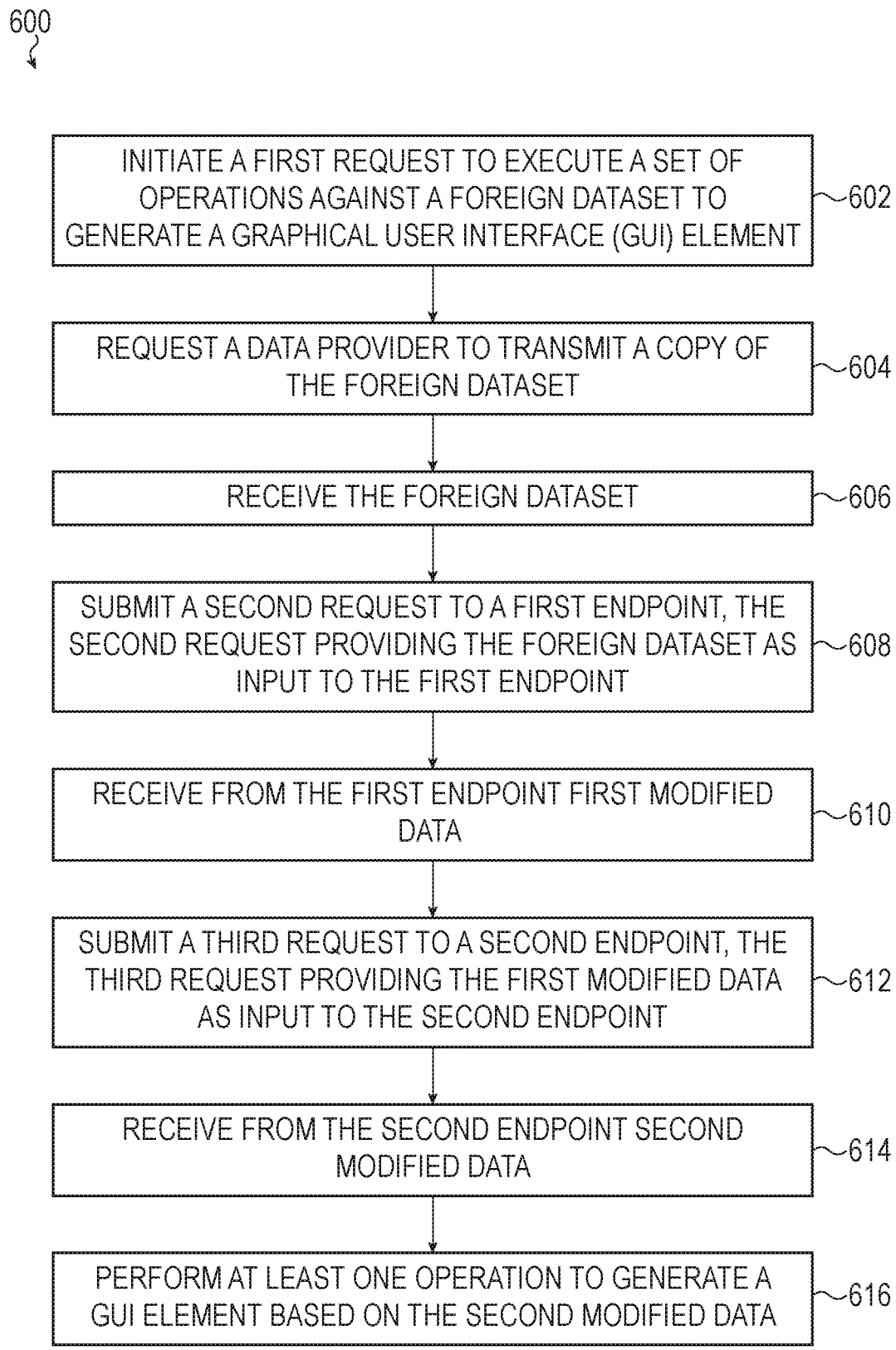
FIG. 6 is a flow chart showing operations of a method for generating or updating content stored in one format to another format for presentation in a graphical user interface of a frontend application, as described herein.

FIG. 6 is a flow chart showing operations of a method for generating or updating content stored in one format to another format for presentation in a graphical user interface of a frontend application, as described herein. A flowchart 600 shown in FIG. 6 corresponds to a method for displaying content in a graphical user interface of a frontend application executing on a client device. The frontend application may provide frontend functionality associated with an application, a function, a module, a microservice, and/or a serverless function, and so, executing on a backend system and/or a cloud platform. The cloud platform may include physical hardware and/or a virtual machine.

At 602, a user of a client device, from an instance of a frontend application, may initiate a first request to execute a set of operations against a foreign dataset to generate a graphical user interface (GUI) element. The set of operations may, for example, may include formatting data differently, or transforming data in to different forms, for example, a line graph, a bar graph, a pie chart, a histogram, and so on.

At 604, the user may generate and/or send a request to a data provider to transmit a copy of the foreign dataset. The request may be sent from the instance of the frontend application. However, in some cases, a request for a copy of the foreign dataset may also be sent from an application server, a serverless function, a microservice, and/or an endpoint in a backend system and/or a cloud platform. The backend system and/or the cloud platform may or may not be part of the same collaborative environment.

At 606, the foreign dataset may be received by the instance of the frontend application in response to the request made at 604. The foreign dataset may be received as a copy. In some cases, the foreign dataset may be received by a reference. When the foreign dataset is received by a reference, current or live data may be accessed by the instance of the browser application. However, when the foreign dataset is received by a value, the data may not be updated or refreshed unless another request to receive the foreign dataset is made.

In other words, the data or content in the foreign dataset may be dynamic content (which may change with time) or static content (which remains fixed), and the dynamic content may be required to be passed by a reference or a request to retrieve the dynamic content be made each time an updated data is needed.

At 608, a second request may be transmitted to a first endpoint. The first endpoint may be an interface to an application, a function, a module, a microservice, and/or a serverless function, and so on, executing on a first backend system. The first backend system may or may not be part of the same collaborative environment. The second request may include the foreign dataset received at 606 as an input, for example, an input reference document, as described herein.

At 610, first modified data may be received by the instance of the frontend application from the first endpoint. As described above, the first modified data may be received as an output reference document from one of an application, a module, a function, a microservice, and/or a serverless function, and so on. The output reference document may be provided as an input to the same or another application, module, function, microservice, and/or serverless function, as described above.

Accordingly, at 612, a third request may be transmitted to a second endpoint. The second endpoint may be an interface to an application, a function, a module, a microservice, and/or a serverless function, and so on, executing on a second backend system. The second backend system may or may not be part of the same collaborative environment, and/or may or may not be different from the first backend system. The third request may include the first modified data received at 610 as an input, for example, an input reference document, as described herein.

At 614, second modified data may be received by the instance of the frontend application from the second endpoint. The output reference document may be provided as an input reference document to the same or another application, function, module, microservice, and/or serverless function, as described above.

At 616, the instance of the frontend application may perform at least one operation of the set of operations to generate the GUI element based on the second modified data. The GUI element may be generated based on the second modified data transmitted to the frontend application as a JSON object, an HTML object, and/or an XML object. As described herein, the content displayed in the GUI element, the first modified data, and/or the second modified data may include dynamic and/or static data/content.

Thus, various embodiments as described in the present disclosure may enable a user to generate and/or update content or data stored in one format to another format for presentation in a graphical user interface of a frontend application. Since data or content for transformation is passed as a reference document (an input reference document), and modified data or content is received as a reference document (an output reference document), the output reference database may also be used as an input reference data to provide inputs to the same or another application executing in the backend system.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for displaying real-time data from multiple software platforms alongside user-generated content within a page, the page associated with a first software platform, the method comprising:

transmitting, by the first software platform, the page for rendering to a client device, the page including web content, the web content comprising user-generated content and a first embedded object at a location within the web content, the first embedded object associated with a second software platform different from the first software platform;

causing the user-generated content to be rendered on a web browser of the client device;

in response to causing the user-generated content to be rendered, automatically submitting, to the second software platform, a first request to refresh a first foreign dataset referenced by the first embedded object, the first foreign dataset associated with the second software platform;

in response to the first request, receiving, from the second software platform at a first endpoint, the first foreign dataset;

transforming the first foreign dataset into a first web renderable dataset, using either a first serverless function or the second software platform;

updating the first embedded object based on the first web renderable dataset;

determining that the transformed first foreign dataset contains a reference to a second embedded object;

in response to determining that the first web renderable dataset references the second embedded object, submitting to the second software platform a second request to refresh a second foreign dataset associated with the second embedded object;

in response to the second request, receiving, from the second software platform, the second foreign dataset;

transforming the second foreign dataset into a second web renderable dataset, using a second serverless function or the second software platform;

updating the second embedded object based on the second web renderable dataset; and causing the updated first embedded object to be rendered with the updated second embedded object at the location within the web content of the page.

2. The method of claim 1, wherein causing the first embedded object to be rendered with the second embedded object comprises generating a pictorial representation of the second web renderable dataset.

3. The method of claim 2, wherein the pictorial representation comprises at least one or more of: a chart, a line graph, a bar graph, a pie chart, a table join, a scatter plot, or a histogram.

4. The method of claim 1, wherein the method further comprises receiving the second foreign dataset from the second software platform at a second endpoint either periodically or upon request from a user of the client device.

5. The method of claim 4, wherein the second foreign dataset is saved as a local reference or a global reference.

6. The method of claim 5, wherein the second foreign dataset saved as the global reference is available across a number of applications.

7. The method of claim 5, wherein the second foreign dataset saved as the local reference is available to a particular application.

8. The method of claim 1, wherein the first web renderable dataset, the second web renderable dataset, or the web content includes static data or dynamic data.

9. The method of claim 1, wherein the first and the second software platform are hosted by one multiplatform cloud service.

10. The method of claim 1, wherein the first web renderable dataset, the second web renderable dataset, or the web content is generated based on a configuration reference that provides one or more rules for formatting of the first web renderable dataset, the second web renderable dataset, or the web content.

11. The method of claim 10, wherein the configuration reference is provided by a user of the client device.

12. A system for displaying real-time data from multiple software platforms alongside user-generated content within a page, the page associated with a first software platform, the system comprising:
   a client device;
   a web server configured to respond to requests from the client device, which when requested from the client device transmits a page for rendering to the client device, the web server configured to:
      in response to receiving, by the first software platform, the page on the client device, the page including web content, the web content comprising user-generated content and a first embedded object associated with a second software platform different from the first software platform, causing the user-generated content to be rendered on a web browser of the client device;
      in response to causing the user-generated content to be rendered at the client device, causing the client device to submit to the second software platform a first request to refresh a first foreign dataset referenced by the first embedded object, the first foreign dataset associated with the second software platform;
      in response to the first request, obtaining, from the second software platform at a first endpoint, the first foreign dataset;
      transforming, using either a first serverless function or the second software platform, the first foreign dataset into a first renderable dataset;
      updating the first embedded object based on the first renderable dataset;
      determining that the transformed first foreign dataset contains a reference to a second embedded object;
      in response to determining that the first renderable dataset references the second embedded object, causing the client device to submit to the second software platform a second request to obtain a second foreign dataset;
      in response to the second request, receiving, from the second software platform, the second foreign dataset;
      transforming, using either a second serverless function or the second software platform, the second foreign dataset into a second renderable dataset;
      updating the second embedded object based on the second renderable dataset; and
      causing the updated first embedded object to be rendered with the updated second embedded object at a location within the web content of the page.

13. The system of claim 12, wherein causing the updated first embedded object to be rendered with the updated second embedded object comprises generating a pictorial representation of the second renderable dataset.

14. The system of claim 13, wherein the pictorial representation comprises one or more of: a chart, a line graph, a bar graph, a pie chart, a table join, a scatter plot, or a histogram.

15. The system of claim 12, wherein a reference to the first foreign dataset is stored on the server, wherein the reference to the first foreign dataset is available on one more of applications executing on the server.

16. The system of claim 12, wherein:
   the transforming the first renderable dataset based upon the first foreign dataset is done using the first serverless function; and
   the first serverless function defines a microservice.

17. A system for displaying real-time data from multiple software platforms alongside user-generated content within a page, the page associated with a first software platform, the system comprising:
   at least one processor; and
   at least one memory configured to store instructions, which when executed by the at least one processor, cause the at least one processor to display content within a page by performing rendering operations comprising:
      in response to causing the at least one processor to display content from a first software platform within the page, the content comprising user-generated content and a first embedded object from the first software platform, automatically submitting, to a second software platform, a first request to update a copy of a first foreign dataset referenced by the first foreign dataset associated with the second software platform;
      in response to submitting the first request, receiving, from the second software platform, a copy of the first foreign dataset;
      in response to receiving the copy of the first foreign dataset, transforming the copy of the first foreign dataset to a first renderable dataset using either a first serverless function or the second software platform;
      updating the first embedded object based on the first renderable dataset;
      determining that the transformed first foreign dataset contains a reference to a second embedded object;
      in response to determining that the first renderable dataset references the second embedded object, submitting, to the second software platform, a second request to receive a second foreign dataset;
      in response to submitting the second request, receiving a copy of the second foreign dataset;

in response to receiving the copy of the second foreign dataset, transforming the copy of the second foreign dataset to a second renderable dataset using either a second serverless function or the second software platform;

updating the second embedded object based on the second renderable dataset;

causing display of the updated first and second renderable datasets within the page.

18. The system of claim 17, wherein displaying the updated first and second renderable datasets further comprises displaying the updated first and second renderable datasets as a unified pictorial representation.

19. The system of claim 18, wherein the pictorial representation comprises at least one or more of: a chart, a line graph, a bar graph, a pie chart, a table join, a scatter plot, or a histogram.

20. The system of claim 17, comprising a laptop, desktop, smartphone, or tablet computer.

21. The system of claim 20, wherein the first renderable dataset or the second renderable dataset are generated based on a stylesheet reference that provides one or more rules for displaying the first renderable dataset or second renderable dataset on a client device.

22. The system of claim 21, wherein the stylesheet reference is stored in the at least one memory.

23. The system of claim 21, wherein the stylesheet reference includes rules for displaying the first renderable dataset on a laptop, a desktop computer, a smartphone, or a tablet computer.

* * * * *